US008966300B2

(12) United States Patent
Pires Dos Reis Moreira

(10) Patent No.: US 8,966,300 B2
(45) Date of Patent: Feb. 24, 2015

(54) DFVS-ENABLED MULTIPROCESSOR

(75) Inventor: Orlando Miguel Pires Dos Reis Moreira, Eindhoven (NL)

(73) Assignee: Ericsson Modems SA, Le Grand-Saconnex (CH)

( * ) Notice: Subject to any disclaimer, the term of this patent is extended or adjusted under 35 U.S.C. 154(b) by 383 days.

(21) Appl. No.: 13/252,661

(22) Filed: Oct. 4, 2011

(65) Prior Publication Data

US 2013/0086402 A1     Apr. 4, 2013

(51) Int. Cl.
| G06F 1/00 | (2006.01) |
| G06F 1/32 | (2006.01) |
| G06F 15/177 | (2006.01) |
| G06F 9/455 | (2006.01) |

(52) U.S. Cl.
CPC .............. *G06F 1/324* (2013.01); G06F 1/329 (2013.01); *G06F 1/3296* (2013.01)
USPC ................ 713/322; 713/320; 715/735; 718/1

(58) Field of Classification Search
USPC ........................ 713/320, 322; 715/735; 718/1
See application file for complete search history.

(56) References Cited

U.S. PATENT DOCUMENTS

| 6,079,025 A | 6/2000 | Fung |
| 6,141,762 A | 10/2000 | Nicol et al. |
| 6,584,571 B1 | 6/2003 | Fung |
| 6,889,330 B2 | 5/2005 | Chauvel et al. |
| 7,194,385 B2 | 3/2007 | Flautner et al. |
| 8,185,758 B2 * | 5/2012 | Henroid et al. ............... 713/300 |
| 2007/0234091 A1* | 10/2007 | Vishin et al. ................. 713/322 |
| 2008/0098254 A1* | 4/2008 | Altevogt et al. .............. 713/600 |
| 2009/0106335 A1* | 4/2009 | Ma et al. ....................... 708/200 |
| 2009/0144572 A1* | 6/2009 | Rozen et al. ................... 713/322 |
| 2011/0046804 A1* | 2/2011 | Fong et al. ..................... 700/291 |
| 2012/0089852 A1* | 4/2012 | Muthukumar et al. ........ 713/322 |

OTHER PUBLICATIONS

Grosse et al. "Methods for Power Optimization in SOC-based Data Flow Systems." ACM Transactions on Design Automation of Electronics Systems, May 2009, pp. 38-38.20, vol. 14, No. 3, Article 38.
Mishra et al. "Energy Aware Scheduling for Distributed Real-Time Systems." Supported by the Defense Advanced Research Projects Agency through the PARTS project; Apr. 2003; pp. 1-9; Computer Science Department, Univerity of Pittsburgh, Pittsburgh, PA.
Niyogi, K and Marculescu, D. 2005. Speed and voltage selection for gals systems based on voltage/frequency islands. In ASP-DAC '05: Proceedings of the 2005 Conference on Asia South Pacific Design Automation. ACM, New York, 292-297.
Saputra, H., Kandemir, M., Vijaykrishan, N., Irwin, M., Hu, J., Hsu, C.-H., and Kremer, U. 2002. Energy-conscious compilation based on voltage scaling. In LCTES02. 2-11.

* cited by examiner

*Primary Examiner* — Paul R Myers
*Assistant Examiner* — Christopher a Daley
(74) *Attorney, Agent, or Firm* — Coats & Bennett, PLLC

(57)     ABSTRACT

One or more tasks to be executed on one or more processors are formulated into a graph, with dependencies between the tasks defined as edges in the graph. In the case of a Radio Access Technology (RAT) application, the graph is iterative, whereby each task may be activated a number of times that may be unknown at compile time. A discrete number of allowable frequencies for processors while executing tasks are defined, and the power dissipation of the processors at those frequencies determined. A linear programming problem is then formulated and solved, which minimizes the overall power dissipation across all processors executing all tasks, subject to several constraints that guarantee complete and proper functionality. The switching of processors executing the tasks between operating points (frequency, voltage) may be controlled by embedding instructions into the tasks at design or compile time, or by a local supervisor monitoring execution of the tasks.

13 Claims, 1 Drawing Sheet

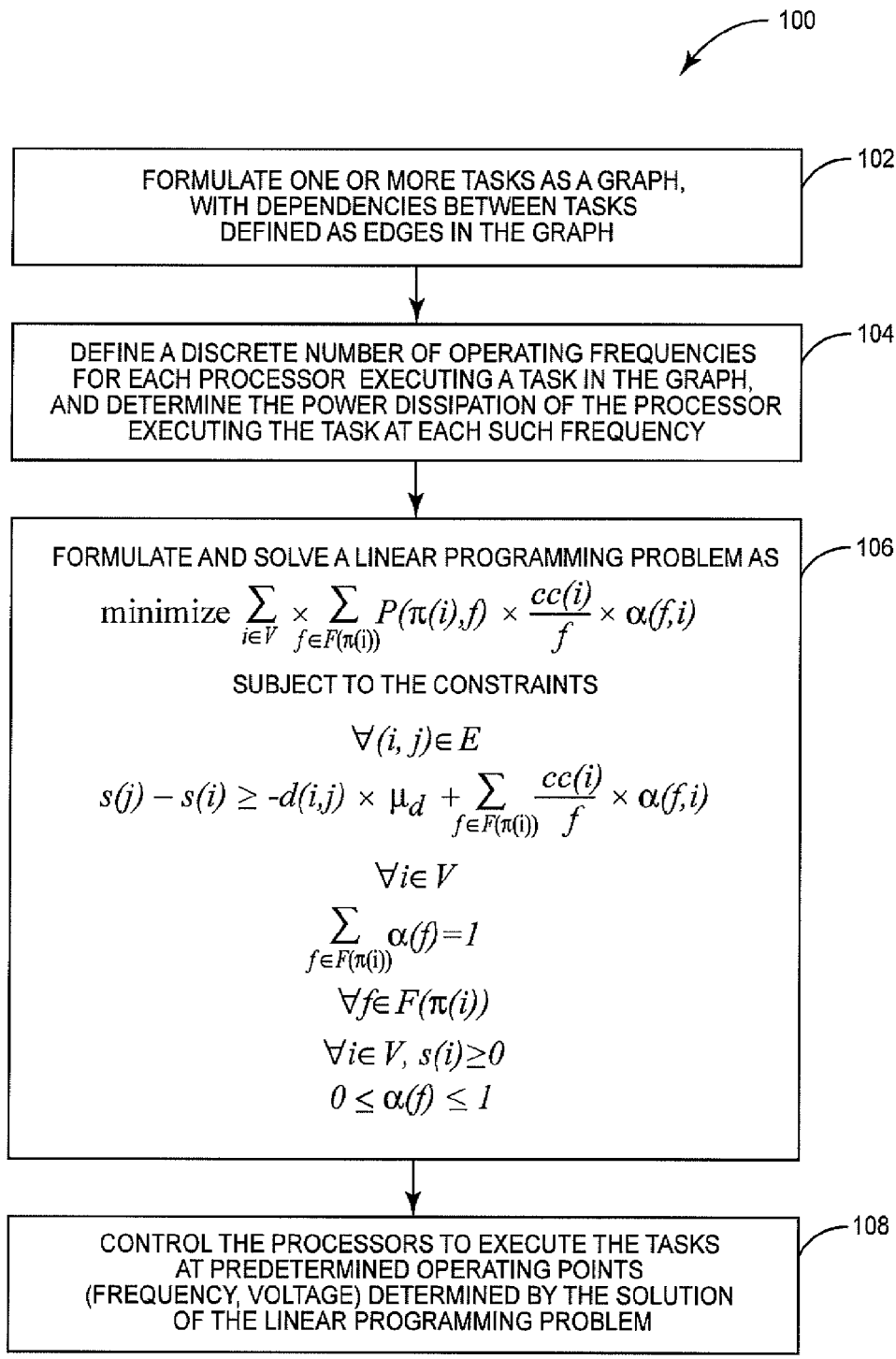

DFVS-ENABLED MULTIPROCESSOR

FIELD OF THE INVENTION

The present invention relates generally to processors and in particular to a method of minimizing power consumption by concurrently controlling the operating points (frequency and voltage) of one or more processor executing one or more tasks.

BACKGROUND

Mobile devices, such as mobile telecommunication terminals (cellphones, smartphones, PDAs, and the like), must operate for long periods before being recharged. These mobile devices usually include multiple processors. Many power management techniques have been suggested to reduce the power consumption of processors in mobile devices.

One such technique, known as Dynamic Voltage and Frequency Scaling (DVFS), includes altering the voltage supplied to a processor as well as the frequency of the clock signal according to the computational load demands of the processor.

Processors equipped with DVFS will typically have a few operating points, where each operating point corresponds a supply voltage level and a corresponding operating frequency. Operating points allowing for higher operating frequencies require higher voltages, and cause higher energy consumption. Transitions between operating points may take a number of execution cycles, while the power level of the supply changes. It is often the case that while transition takes place, the processor must operate at the lower of the two frequencies involved in the transition.

Prior art approaches to DVFS have been limited. For example, it is known to use a mode control monitor to detect a level of activity of a processor, and switch discrete operating points. This approach does not consider real-time requirements, or have a clear algorithm to decide which operating point to execute under. It is also known to monitor task activities to switch power levels dynamically when the system reaches a maximum power threshold. In other approaches, task-level monitoring is used to define performance level intervals. It is also known to map tasks to processors to balance the load amongst processors, and then reduce supply voltage to some or all of the processors.

A paper by P. Grosse, at al, titled "Methods for Power Optimization in SOC-based Data Flow Systems," published in May 2009 in ACM Transactions on Design Automation Electron. Syst. describes a method, based on linear programming, to assign at compile time an operating frequency to each of a number of hardware functional units, executing in a data-triggered, self-timed manner, so that the temporal requirements (throughput, latency) of a modem application are met, while minimizing power consumption. This, however, assumes that a single operating point is assigned per functional unit. Also, it assumes that concurrent applications are data flow graphs with no cyclic dependencies. It further assumes that between frames there is no pipelined behavior: the execution of an iteration of the data flow graph must be fully finished before the next iteration starts. Furthermore, it assumes that operating points are given by a continuous function, i.e., in any given interval, all frequencies are available. This problem cannot be solved optimally in polynomial time, and therefore the authors resort to a linearization of the objective function (minimize energy consumption) that allows them to model the problem as a linear program.

The April 2003 paper "Energy Aware Scheduling for Distributed Real-Time Systems" only considers systems where all processors must always switch frequency/power operating points at the same time. Furthermore, it cannot handle cyclic graphs, and it can only stretch the execution times to meet a deadline for an acyclic task graph. It divides the execution of all tasks in phases and assigns an operating point to each phase. This is not done optimally, but using a heuristic. It considers only static scheduling of task graphs. It also assumes that any operating point is possible in a continuous range.

Most of these prior art approaches assume a single operating point per task. Also, most assume continuous frequency levels, and most do not handle data flow graph cyclicity (i.e., cyclic dependencies between tasks in a task graph).

SUMMARY

According to embodiments of the present invention, one or more tasks to be executed on one or more processors are formulated into a graph, with dependencies between the tasks defined as edges in the graph. In the case of a Radio Access Technology (RAT) application, the graph may be iterative. A discrete number of allowable frequencies of processors while executing tasks are defined, and the power dissipation of the processors at those frequencies determined. A linear programming problem is then formulated and solved, which minimizes the overall power dissipation across all processors executing all tasks, subject to several constraints that guarantee complete and proper functionality. The switching of processors executing the tasks between operating points (frequency, voltage) may be controlled by embedding instructions into the tasks at design or compile time, or by a local supervisor monitoring execution of the tasks. The linear programming problem can be solved in polynomial time by most linear programming solvers (such as GLPK, the Gnu Linear Programming Kit).

As one example, for each task there is computed a percentage of its cycles (alpha(task)) that must be computed on a high operating point (high frequency, high power density) and a percentage of its cycles (1-alpha(task)) that must be executed at a low operating point (low frequency, low power density). Instructions are inserted in the task code that directly control the switching from one operating point to the other. Alternatively, in one embodiment, some local supervisor is aware of the progress of the task, and enacts the switching between high and low operating points. Only one operating point switch is required per task, if two operating points are available. The reason for this is that if for the first task we start with the high operating point and then switch to the low operating point, for the next task we can start on the low operating point and then switch to the high operating point and so on. More operating points may be defined per processor; in this case the operating point is switched a number of times which is the number of operating points minus one. The invention also provides a processor system comprising one or more processors. The processor system is configured to execute one or more tasks in accordance with at least one task execution method in accordance with the invention.

BRIEF DESCRIPTION OF THE DRAWINGS

FIG. 1 is a flow diagram of a method of executing tasks by processors.

DETAILED DESCRIPTION

The following assumptions define the environment in which embodiments of the present invention are applied:

Iterative tasks execute on different cores on a heterogeneous, homogeneous, or mixed heterogeneous and homogeneous multi-processor environment. That is, the environment may include several different types of processors, and/or several processors of each type. As used herein, a "processor" may comprise a conventional stored-program processor or Digital Signal Processor (DSP), but is not necessarily limited to such processors. Rather, a "processor" as used herein may include domain-specific hardware accelerators (e.g., cryptographic engine, graphics accelerator, and the like).

Buffers (preferably FIFO queues with read/write access control of some kind) store data required by tasks for execution, including data generated by one task and consumed by another task.

Each task requires a well-defined quantum of data in each of its input buffers in order to activate. When activated, the task consumes a well-defined quantum of data from each of its input buffers and produces a well-defined quantum of data on each of its output buffers.

An application, such as a Radio Access Technology (RAT) or a specific mode/use-case of the execution of a RAT, is described as a number of these iterative tasks with data dependencies between them, such that the activation of each task is triggered by the arrival of data to be consumed, the data being generated by another task. The application can be described as a Data Flow graph, such as a Single-Rate Data Flow graph, also known as Homogeneous Data Flow graph, but may also be described as Synchronous Data Flow, Cyclo-Static Data Flow, Boolean Data flow, and many other Data Flow flavors.

Each processor core has at least two possible operating points (i.e., operating frequency and corresponding supply voltage value), and operating point switching is feasible during execution. Furthermore, each processor can switch between operating points independently of other processors.

In one embodiment, for each processor core, tasks belonging to an application are statically ordered. For Boolean data flow, this constraint is extended to quasi-statically ordered—that is, depending on a control word, one of several static schedules is selected for execution. In another embodiment, tasks may be scheduled in different budgets of a budget scheduler. In this case, the effect of the budget scheduler on the execution is modeled as for tasks belonging to other applications, as described below.

The application has real-time requirements that can be expressed as either the throughput of a task or the latency of a chain of tasks.

Task activation per processor is dependent on the internal ordering of tasks and on the availability of data and space in the input/output buffers, i.e., the schedule is self-timed.

A conservative worst-case cycle count is known for each task.

It is possible that other applications are at the same time running on a given processor, as long as a local scheduler arbitrates between applications (i.e., several applications can be supported where each application has a static order of execution per processor, and each processor implements a higher level scheduler that commutes between the static order of each application. In one embodiment, this scheduler is a budget scheduler that guarantees a given amount of resources per time interval to each application).

Within these assumptions, the problem to solve is how to statically (i.e., at design, or compile time) determine when switching between operating points should occur in all processors, in order to get the lowest energy consumption, while meeting the real-time requirements of the application. This is determined by formulating and solving a Linear Program (LP) having various task and system constraints. This Linear Programming formulation, for any number of operating points per processor is $$\text{minimize} \sum_{i \in V} \times \sum_{f \in F(\pi(i))} P(\pi(i), f) \times \frac{cc(i)}{f} \times \alpha(f, i)$$

subject to
$\forall (i,j) \in E,$ $$s(j) - s(i) \geq -d(i, j) \times \mu_d + \sum_{f \in F(\pi(i))} \frac{cc(i)}{f} \times \alpha(f, i),$$

$\forall i \in V,$ $$\sum_{f \in F(\pi(i))} \alpha(f, i) = 1,$$

$\forall f \in F(\pi(i)),$
$\forall i \in V, s(i) \geq 0,$ and
$0 \leq \alpha(f,i) \leq 1,$ where
V is a set of tasks in a graph,
E is a set of edges in the graph, each edge (i,j) representing a data dependency between a producer task i generating data and a consumer task j consuming the data,
d(i,j) represents an iteration distance, such that, for example, if d(i,j)=2, then the kth execution of task j is dependent on the (k−2) execution of task i. This constraint flows from the assumption that the application is a streaming application, in which each task executes a virtually infinite number of tasks, and dependencies can be between different firings of tasks.
f is a frequency allowed for a processor,
F(p) is a set of frequency points allowed for processor p,
$\pi(i)$ is a processor to which task i is mapped,
P(p,f) is a power dissipation of processor p at frequency f,
cc(i) is a cycle count of task i,
$\alpha(f,i)$ is a percentage of the cycles of a task i that are executed at frequency f, such that the sum of all $\alpha(f,i)$ for a given task is equal to one,
$\mu_d$ is a minimum rate at which a task must be executed, and
s(i) is a free variable indicating the worst-case start time of task i.

Also, latency requirements can be added by adding constraints of the type s(j)−s(i)<=(latency between each activation of task i and subsequent activation of task j).

Static ordering of actors within a processor can be represented by adding edges with d(i,j)=0 delays from each preceding task i in the ordering to its succeeding task j in the ordering. An edge must be placed between the last task in the order and the first task in the order. The d for this edge is 1, as it indicates only after executing all tasks in the ordering can the processor start executing in the same order again.

More edges can be used to represent buffer sizes between tasks. In other words, the dependence of a producer task on the availability of space to write data into a buffer for the consuming task: for an edge (i,j), a buffer constraint edge (j,i) needs to be added, with d(j,i)=(size_of_buffer−d(i,j)).

A model of a local budget scheduler running on any of the processors can also be added, this will essentially change the value on the right hand side of the first constraint.

This Linear Program can be solved in polynomial time by most Linear Programming Solvers (such as GLPK), and yields a near-optimal solution One small inaccuracy is due to the fact that the percentage of cycles at a particular operating point (frequency, voltage) obtained as a solution may not be realizable. For example, if a particular task has 100 cycles to execute, and the linear programming solution is that 60.1% of the cycles should be executed at a high operating point, this must be rounded to 61%, since it is not possible to execute fractions of a cycle at different operting points. Thus, in a practical implementation, the percentages for the high frequencies would be rounded up (to ensure adequate performance), and an adjustment made on other frequencies. This error decreases, as a percentage, as task size (number of cycles) increases—i.e., at 100 cycles, approximately one cycle of execution may require rounding up, which on a processor with two operating points is just 1% of the cycle count, and of course the percentage decreases as the number of cycles increases. Even though one particular way of handling fraction cycles was just described, it is clear that other ways of obtaining integer cycle counts are available. Fractional cycle counts could for instance be rounded down.

In one embodiment, this potential error source is addressed by solving the above equations as a mixed integer linear program. In this case, the percentages of cycle counts executed at each operating point is required to be an integer number of cycles. Rather than $\alpha(f,i)$, the number of cycles to execute at each allowed frequency is represented as a variable, e.g., $cc(f,i)$, and two additional constraints are imposed. One is that all $cc(f,i)$ be integer counts, and the other is that the sum of all $cc(f,i)$ for all frequencies per task is less than or equal to $cc(i)$.

FIG. 1 depicts a method 100 of optimizing the power consumption of one or more processors executing one or more tasks in an application. The tasks are organized as a graph, with dependencies between tasks defined as edges in the graph (block 102). The allowable frequencies of the processors while executing the tasks are also defined, and the power dissipation of the processors at those frequencies is determined (block 104). The above-defined linear programming problem is then formulated and solved, subject to the above-identified constraints (block 106). The processors are then controlled to execute the tasks at operating points (frequency, voltage) as determined by the solution to the linear programming problem (block 108). This may comprise embedding instructions into the tasks, where such an instruction is operative to cause the executing processor to switch operating points. Alternatively, the processor operating point control may be implemented by a local supervisor monitoring the execution of the tasks.

The processors are for instance processor instances in a mobile telephone or other computing unit. The methods described are implemented by control means connected to the processor instances of the computing unit, in order to execute tasks as described herein.

Embodiments of the present invention enable the use of DVFS with a finite, discrete number of operating points, to lower the power consumption necessary to the performance of a computational task on a multiprocessor, while guaranteeing that the temporal requirements are met. Compared with other solutions, it suffers from very low run-time overhead, and it provides an optimal solution (assuming instant transition between operating points) in polynomial time, or very dose to optimal (assuming fast transitions between operating points).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of executing one or more tasks on one or more processors to reduce overall power consumption, comprising
formulating the tasks as a graph with dependencies between tasks defined as edges in the graph;
defining a discrete number of operating frequencies for each processor executing a task in the graph, and determining a power dissipation of the processor executing the task at each such frequency; and
minimizing the sum, over all tasks in the graph and over all allowed frequencies per processor per task, of the product of
the power consumption of a task on a processor at a frequency,
the ratio of the cycle count of the task to each allowed frequency, and
the percentage of cycles of the task executed at each frequency;
subject to the constraints that
all the tasks to be executed are in the graph,
all of the frequencies considered are allowed frequencies for a task on a processor,
the percentage of cycles of a task executed at a given frequency is between 0 and 100%,
the sum of the percentages of cycles of a task executed at a plurality of frequencies is 100%, and
the difference in worst-case start times between tasks i and j is greater than or equal to the sum of
the negative of the number of times one task must execute before the next can begin, times a minimum rate at which a task may be executed and
the ratio of the cycle count of each task to each allowed frequency, times the percentage of cycles of the task executed at each frequency, this product summed over all allowable frequencies per processor for each task; and
determining a percentage of the cycles for each task to operate on a processor at an allowable frequency to achieve the minimization under the constraints; and
causing each task to execute on each processor at an allowed frequency for the determined percentage of its cycles.

2. The method of claim 1 wherein causing each task to execute on each processor at an allowed frequency for the determined percentage of its cycles comprises embedding instructions in each task operative to force a processor executing the task to do so at a predetermined operating point defined by frequency and supply voltage level.

3. The method of claim 1 wherein causing each task to execute on each processor at an allowed frequency for the determined percentage of its cycles comprises monitoring each task by a supervisor function operative to control the processor to operate at a predetermined operating point defined by frequency and supply voltage level.

4. The method of claim 1 wherein the minimization is achieved by formulating and solving a linear programming problem as:

$$\text{minimize} \sum_{i \in V} \times \sum_{f \in F(\pi(i))} P(\pi(i), f) \times \frac{cc(i)}{f} \times \alpha(f, i)$$

and
wherein the constraints are formulated as
$\forall (i,j) \in E$, $$s(j) - s(i) \geq -d(i,j) \times \mu_d + \sum_{f \in F(\pi(i))} \frac{cc(i)}{f} \times \alpha(f, i),$$

$\forall i \in V$, $$\sum_{f \in F(\pi(i))} \alpha(f, i) = 1,$$

$\forall f \in F(\pi(i))$,
$\forall i \in V, s(i) \geq 0$
$0 \leq \alpha(f,i) \leq 1$, where
V is a set of tasks in a graph,
E is a set of edges in the graph, each edge (i,j) representing a data dependency between a producer task i generating data and a consumer task j consuming the data,
d(i,j) represents an iteration distance between tasks i and j, such that the kth execution of task j is dependent on the (k−d(i,j)) execution of task i,
f is a frequency allowed for a processor,
F(p) is a set of frequency points allowed for processor p,
π(i) is a processor to which task i is mapped,
P(p,f) is a power dissipation of processor p at frequency f,
cc(i) is a cycle count of task i,
α(f,i) is a percentage of the cycles of a task that are executed at frequency f, such that the sum of alphas for a given task is equal to one,
$\mu_d$ is a minimum rate at which a task must be executed, and
s(i) is a free variable indicating the worst-case start time of task i.

5. The method of claim 4 further comprising including into the linear programming problem one or more latency requirements formulated as
s(j)−s(i)≤(the latency between each activation of task i and subsequent activation of task j).

6. The method of claim 4 further comprising defining static ordering of tasks within a processor by adding edges with d(i,j)=0 delays from each preceding task i in the ordering to its succeeding task j in the ordering, subject to the constraint that an edge with d=1 is placed between the last task in the order and the first task in the order.

7. The method of claim 4 further comprising adding edges to represent buffer sizes between tasks, wherein the buffer size represents the dependence of a producer task on the availability of space to store data in the buffer for a consuming task.

8. The method of claim 7 wherein the linear programming problem is further constrained by a buffer constraint edge (j,i) being added for each inter-task buffer, with the constraint that d(j,i)=(size_of_buffer−d(i,j)).

9. A method of executing one or more tasks on one or more processors to reduce overall power consumption, comprising:
formulating a set of tasks, each comprising a predetermined set of instructions, as a graph V;
defining a set of edges E in the graph, each edge (i,j) representing a data dependency between a producer task i generating data and a consumer task j consuming the data;
defining an iteration distance d(i,j) between tasks i and j such that the kth execution of task j is dependent on the (k−d(i,j)) execution of task i;
determining one or more frequencies f allowed for a processor;
defining a set of frequencies F(p) allowed for processor p;
identifying a processor π(i) to which task i is mapped;
determining a power dissipation P(p,f) of processor p at frequency f;
determining a cycle count cc(i) of task i;
determining a percentage α(f,i) of the cycles of a task i that are executed at frequency f, such that the sum of all α(f,i) for a given task is equal to one;
determining a minimum rate $\mu_d$ at which a task must be executed;
determining a free variable s(i) indicating a worst-case start time of task i; and
formulating a linear programming problem as $$\text{minimize} \sum_{i \in V} \times \sum_{f \in F(\pi(i))} P(\pi(i), f) \times \frac{cc(i)}{f} \times \alpha(f, i),$$

subject to the constraints
$\forall (i,j) \in E$, $$s(j) - s(i) \geq -d(i,j) \times \mu_d + \sum_{f \in F(\pi(i))} \frac{cc(i)}{f} \times \alpha(f, i),$$

$\forall i \in V$, $$\sum_{f \in F(\pi(i))} \alpha(f, i) = 1,$$

$\forall f \in F(\pi(i))$,
$\forall i \in V, s(i) \geq 0$, and
$0 \geq \alpha(f,i) \geq 1$.

10. The method of claim 9 wherein the linear programming problem further includes the constraint that s(j)−s(i)≤(the latency of each activation of task i and subsequent activation of task j).

11. The method of claim 9 wherein static ordering of tasks within a processor is represented by adding edges with d(i,j)=0 delays from each preceding task i in the ordering to its succeeding task j in the ordering, subject to the constraint that an edge having d−1 must be placed between the last task in the order and the first task in the order.

12. The method of claim 11 further comprising adding edges to represent buffer sizes between tasks, wherein the buffer size represents the dependence of a producer task on the availability of space to store data in the buffer for a consuming task.

13. The method of claim 12 wherein the linear programming problem is further constrained by a buffer constraint edge (j,i) being added for each inter-task buffer, with the constraint that d(j,i)=(size_of_buffer−d(i,j)).

* * * * *